United States Patent [19]

Spilkin et al.

[11] Patent Number: 4,528,103
[45] Date of Patent: Jul. 9, 1985

[54] PRESSURE FILTER

[75] Inventors: Gordon Spilkin, Stamford; Jack H. Eichler, Westport; Peter Kos, Ridgefield, all of Conn.

[73] Assignee: Dorr-Oliver Incorporated, Stamford, Conn.

[21] Appl. No.: 597,779

[22] Filed: Apr. 6, 1984

[51] Int. Cl.³ .............. B01D 29/24; B01D 29/38
[52] U.S. Cl. .................... 210/791; 210/779; 210/313; 210/323.2; 210/333.01
[58] Field of Search .......... 210/779, 791, 797, 798, 210/805, 808, 312, 313, 323.2, 332, 333.1, 333.01, 411, 412, 409, 416.1, 456, 540

[56] References Cited

U.S. PATENT DOCUMENTS

| | | | |
|---|---|---|---|
| 1,575,907 | 3/1926 | Genter | 210/779 |
| 2,035,592 | 3/1936 | Christensen | 210/779 |
| 2,784,846 | 3/1957 | Olson | 210/333.01 |
| 2,788,126 | 4/1957 | Gardes | 210/333.01 |
| 2,968,404 | 1/1961 | Hotz | 210/334 |
| 3,251,473 | 5/1966 | Fuhring | 210/332 |
| 3,280,978 | 10/1966 | Scott | 210/333.01 |
| 3,438,502 | 4/1969 | Schmidt | 210/323.2 |
| 3,992,297 | 11/1976 | Baughcom | 210/540 |
| 4,088,579 | 5/1978 | Kocsanyi | 210/333.01 |
| 4,213,861 | 7/1980 | Muller | 210/333.01 |
| 4,243,533 | 1/1981 | Savolainen | 210/323.2 |
| 4,264,445 | 4/1981 | Lumikko | 210/333.01 |
| 4,436,633 | 3/1984 | Robinsky | 210/333.01 |

Primary Examiner—Ernest G. Therkorn
Attorney, Agent, or Firm—Burtsell J. Kearns; Gary R. Plotecher

[57] ABSTRACT

A pressure filter for separating a liquor from mud liquor slurry and for concentrating a filter cake as a heavy slurry discharge comprising a tank having a ring of filter elements supported by a plate which separates the filter tank from a filtrate chamber. The feed enters the tank under pressure through an enlarged feed cylinder tube located in the center of the ring of filter elements. In the backwashing mode of operation the feed rate is maintained or increased to assist in displacing filter cake from the filter elements.

11 Claims, 4 Drawing Figures

PRESSURE FILTER

BACKGROUND OF THE INVENTION

The present invention is directed to new and useful improvements in pressure filters and more particularly to a pressure filter used for separating a liquid from a solids slurry solution and concentrating the solids as a thickened underflow discharge from the filter.

In pressure filtration, a feed slurry is pumped into a pressure vessel and solids which are separated from the liquid collect as a filter cake on a filter medium while the filtrate passes through the filter medium into a filtrate compartment in the vessel. By selecting a filter medium of sufficiently fine pores the solids content of the filtrate can be reduced to a very low level. Periodically the solids are removed from the filter medium by the action of a backflow of filtrate from the filtrate compartment and allowed to settle at the bottom of the vessel from which it is removed through a sump discharge.

Pressure filters of the type mentioned are used for example in kraft pulp mill recausticizing systems for white liquor clarification and lime mud washing and thickening. In these filtration devices a slurry is fed under pressure into a cylindrical filter tank and the liquor is forced through suspended tubular filter elements which comprise perforated tubes having filter socks covering the outer surface thereof and to which surface adheres the lime mud filter cake. The clarified liquor enters a filtrate chamber located in the upper portion of the tank above the filter elements and is discharged therefrom to an overflow launder or directed to a head box located above the tank and from which head box the liquor flows to an appropriate storage tank.

In certain of these filters a pressurized air cushion is established in the filtrate chamber beneath a dome cover to assist in the cake discharge operation which is initiated by operation of a sump outlet valve to cause a rapid fall of pressure in the lower part of the filter tank. As the air cushion in the filtrate chamber expands the filtrate is forced back through the filter elements at a high flow rate to remove the cake therefrom for discharge through a sump outlet. In another similar type filter the backwashing of the filter cake from the filter elements is effected by dissipating the pressure in the filter tank and venting the filtrate chamber to the atmosphere causing the liquor to flow back through the filter elements by hydrostatic pressure to remove the filter cake from the surface of the elements. In these known filters the operation of the filter is automatic and cyclical usually lasting 4-6 minutes processing 310 to 925 gallons per minute depending upon the capacity of the filter tank.

Typical of these prior art filtration devices are disclosed in in U.S. Pat. Nos. 1,452,151; 2,035,592; 2,391,534; 3,356,215 and 4,243,533. In these patents pressure filters are disclosed, for example, for use in the filtering and clarification of white liquor in a kraft pulp mill process and for discharging a thickened lime mud solids discharge. In certain of these patents the liquor is pumped from the filter elements into a filtrate compartment which is comprised of a plurality of segmented filtrate compartments and wherein the backwashing is controlled by the operation of a rotary valve for periodically and sequentially backwashing a predetermined number of filter elements in accordance with its position relative to a filtrate compartment. In other of these patents the filter elements are backwashed by filtrate from the filtrate compartments or chambers by hydrostatic pressure upon dissipation of the pressure within the filtrate tank.

It is an object of the present invention to provide a novel pressure filter wherein the rate of filtration is increased while filtrate liquor clarity levels are maintained.

Another object is to provide a novel pressure filter wherein novel cake flushing and displacement means are utilized for assisting in cake removal from the filter cake for discharge from the filter tank.

Another object is to provide a novel method for operating a filter with high differential pressure across the filter elements to increase productivity and lower overall equipment costs.

A still further object is to provide a novel pressure filter and method of operation to effect high rate performance and requiring shorter residence time of solids in the solids underflow settling region and for providing forward flush means for removing the filter cake during cyclical operation of the filter.

SUMMARY OF THE INVENTION

The present invention contemplates a novel pressure filter and method of operating the filter for separating a liquor from a mud liquor slurry and for concentrating the filter cake as a heavy slurry discharge from the filter tank. The filter comprises an elongated cylindrical tank having a plurality of filter elements suspended from a support plate located at the upper portion of the tank. The feed comprises an enlarged center tube member located in the center of a ring of suspended filter elements with the slurry discharging outwards from the top of the center tube and then downward between the filter elements under pressure whereby filter cake adheres to the outer surface of the filter elements and filtrate is discharged to a filtrate chamber located above the filter elements. The backflushing of the filtrate for discharging the lime mud cake is initiated automatically and periodically. During backwashing the feed rate of slurry is increased or maintained to assist in the flushing of the filter cake from the filter elements. The area between the bottom of the filter elements and the entry to a barometric leg provided in the lower region of the tank functions as a displacement zone in which the cake removed from the elements is located during the backwash mode to replace feed slurry which is returned to the feed tank during the backwashing step through the barometric leg which may also provide a pressure differential to assist in the backwashing step of the filtration cycle.

The above and other objects of the present invention will appear more fully hereinafter from a consideration of the detailed description which follows taken together with the accompanying drawings wherein two embodiments are illustrated.

DETAILED DESCRIPTION

Figure 1:
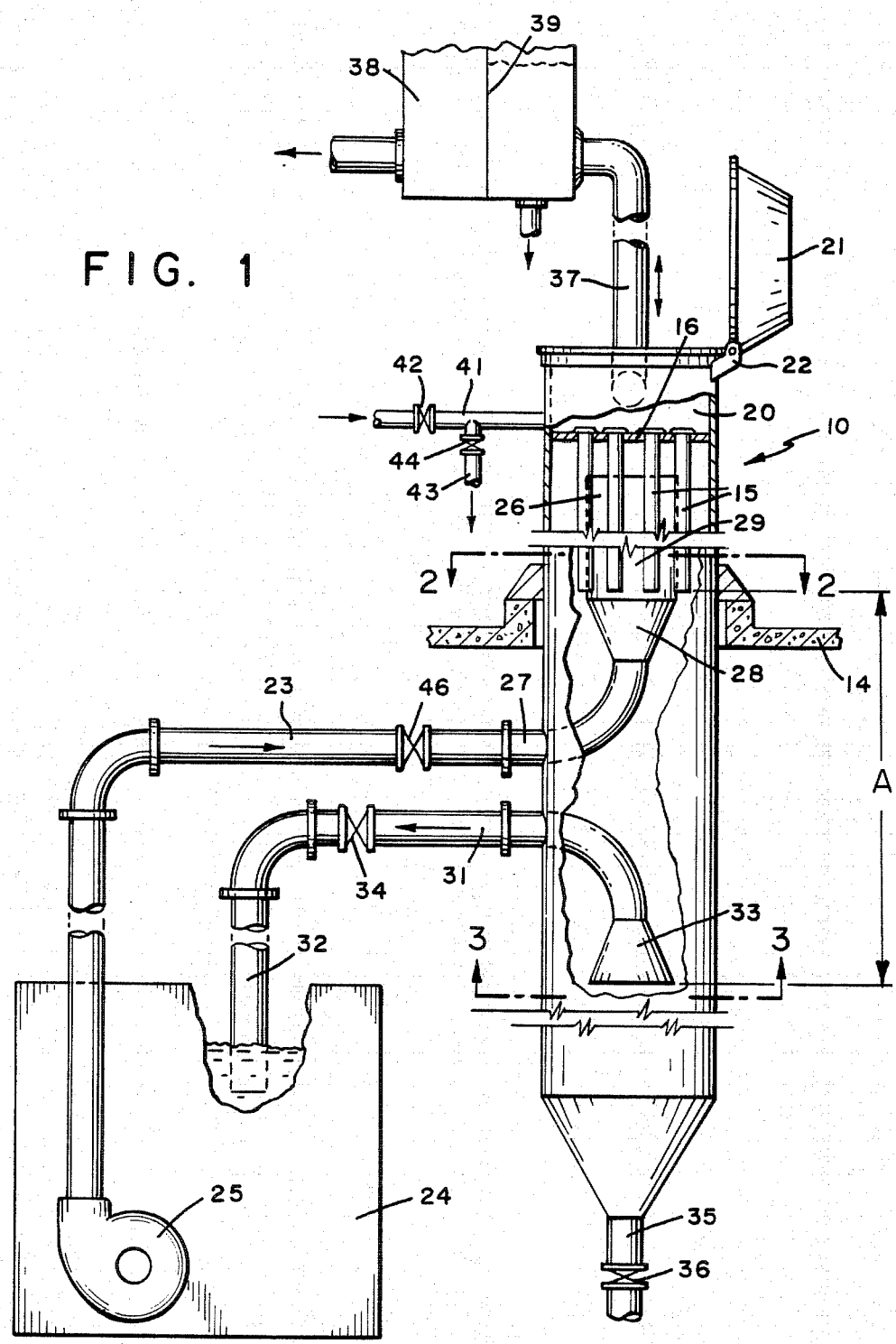
FIG. 1 is a schematic elevational view of a pressure filter embodying the present invention with parts thereof broken away to show interior portions of the filter apparatus.

Referring now to the drawings for a more detailed description of the present invention, a pressure filter incorporating an embodiment of the present invention is generally indicated by the reference numeral 10 in FIG. 1. Filter 10 comprises a cylindrical tank 11 constructed of stainless steel and having a typical size range wherein the diameter of tank 11 is 3 feet and of a height of approximately 21 feet. Tank 11 is adapted to be mounted in a floor 14 of an industrial building such as in a kraft pulp mill housing a recausticizing system wherein the filter is adapted to separate a white liquor filtrate and thicken a lime mud filter cake as a discharge.

A ring of filter elements 15 are suspended from a cylindrical support plate 16 located in the upper portion of tank 11 above floor 14. Each filter element 15 is of a generally well known construction and comprises a perforated metal tube 18 which is covered with a permeable sock 19 (FIG. 2) made from a suitable material such as a needled felt material. A filtrate chamber which is indicated by reference numeral 20 is located above filter element support plate 16. A dome shaped tank cover 21 is mounted on the upper portion of tank 11 by a hinge 22 and locked thereto by any suitable means such as releasable clamp members (not shown) which when removed permit cover 21 to pivot about hinge 22 to the open position shown in FIG. 1 to provide access to filtrate chamber 20 for removal or inspection of filter element 15 as needed.

As mentioned it is a feature of the present invention to provide a novel feed means for introducing a feed slurry to tank 11 at a high flux rate via a feed pipe 23 from a slurry storage tank 24 by means of pump 25. To this end a central feed element 26 is provided in tank 11 having an elbow pipe connection to a slurry feed inlet 27 in the wall of tank 11. Feed element 26 comprises a frustro conical or funnel shaped lower portion 28 from which extends an enlarged cylindrical tube section 29 approximately 2 feet in diameter which terminates a short distance beneath filter element support plate 16.

A barometric leg 31 is provided having one end 32 in slurry feed tank 24 and extends therefrom to the lower portion of tank 11 to terminate in a funnel-shaped end portion 33. An automatically operable valve 34 is provided in barometric leg 31 for operation in a manner to be explained. In addition a solids discharge sump outlet 35 controlled by valve 36 is provided at the base of tank 11.

As shown in FIG. 1 a filtrate discharge pipe 37 is connected to an outlet in the wall of filtrate chamber 20 and extends upwardly to a head box 38 to which filtrate is fed under pressure for discharge over an internal weir plate 39 to a liquor storage tank (not shown) in a manner also to be further explained. In addition a pipe 41 is connected to filtrate chamber 20 and is controlled by normally closed valve 42 from which acid feed is fed when needed for periodically backcleaning of filter elements 15 in a usual manner. In addition a pipe 43 is connected to pipe 41 and controlled by valve 42 for leading filtrate to slurry feed tank 24 when it is desired to empty filtrate compartment 20 for inspection.

In operation of filter 10 for the pressure filtration of a slurry as for example the white liquor clarification and lime mud washing and concentration in a paper mill feed liquor is fed under pressure by pump 24 to tank 11 through pipe 23 upon opening of valve 46. The feed moves upwardly through feed element 26 to overflow the upper edges of tube portion 29. During the filtering cycle valves 34, 36, 42 and 44 remain closed as the filter cake adheres to the outer surface of filter elements 15. Liquor is forced through elements 15 to filtrate chamber 20 from which it is directed outwardly through outlet 37 upwardly to head box 38 from which the filtrate overflows weir 39 for discharge to a storage tank (not shown).

During the filtration cycle a pressurized air cushion is maintained between the upper level of the filtrate in chamber 20 and the undersurface of cover 21 with the pressure determined by the elevation of head box 38 in a known manner. The removal of cake from elements 15 is initiated by the opening of flush valve 34 and sump underflow valve 36. A negative pressure is generated in tank 11 and filtrate is caused to flow back through filter elements 15 to aid in dislodging cake from filter elements 15 for discharge through sump 35. At the same time feed pump 25 continues to supply slurry to tank 11 at an equal or increased flow rate whereby the incoming feed from feed element 26 aids in displacing dislodged solids out of the region of tube 29 into the region below the filter elements 15. Typically the filtering cycle will comprise a filtering time of 20 to 30 seconds with a backflush and forward flushing period of between 4 to 8 seconds comprising a total filtering thickening and backwashing cycle of between 24 and 38 seconds all of which is automatically controlled by a suitable timing circuit.

During the filtration cycle feed slurry is maintained in a zone designated A in FIG. 1. As the solids are displaced from the filter elements 15 the feed slurry in displacement zone A is returned to the feed tank 24 via the barometric leg 31 which may also function as a vacuum assist during the backwashing phase. The distance between the lower ends of filter elements 15 and the entry to barometric leg 31 at funnel portion 33 is predetermined whereby during the 5 second backwash step the cake from element 15 will not drop or descend beyond funnel 33 prior to recommencement of the filtering cycle so that the dislodged solids will not enter the barometric leg 30 but will drop to sump 36 which is then deactivated by closing of valve 34.

Figure 2:
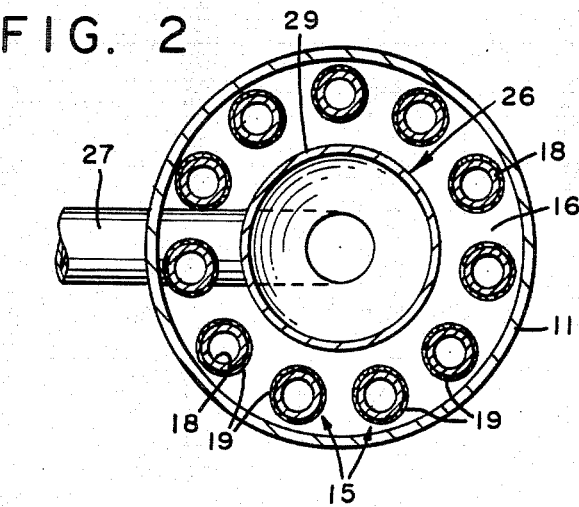
FIG. 2 is a sectional view taken on the line 2—2 of FIG. 1.
Figure 3:
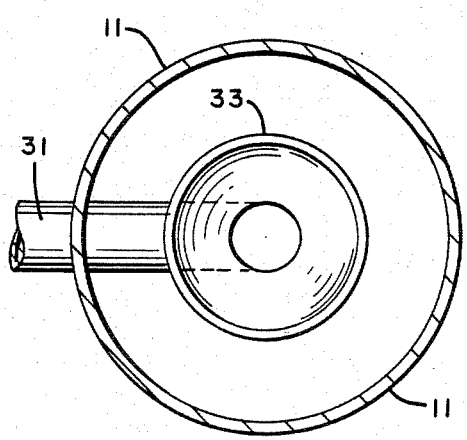
FIG. 3 is a sectional view taken on the line 3—3 of FIG. 1.
Figure 4:
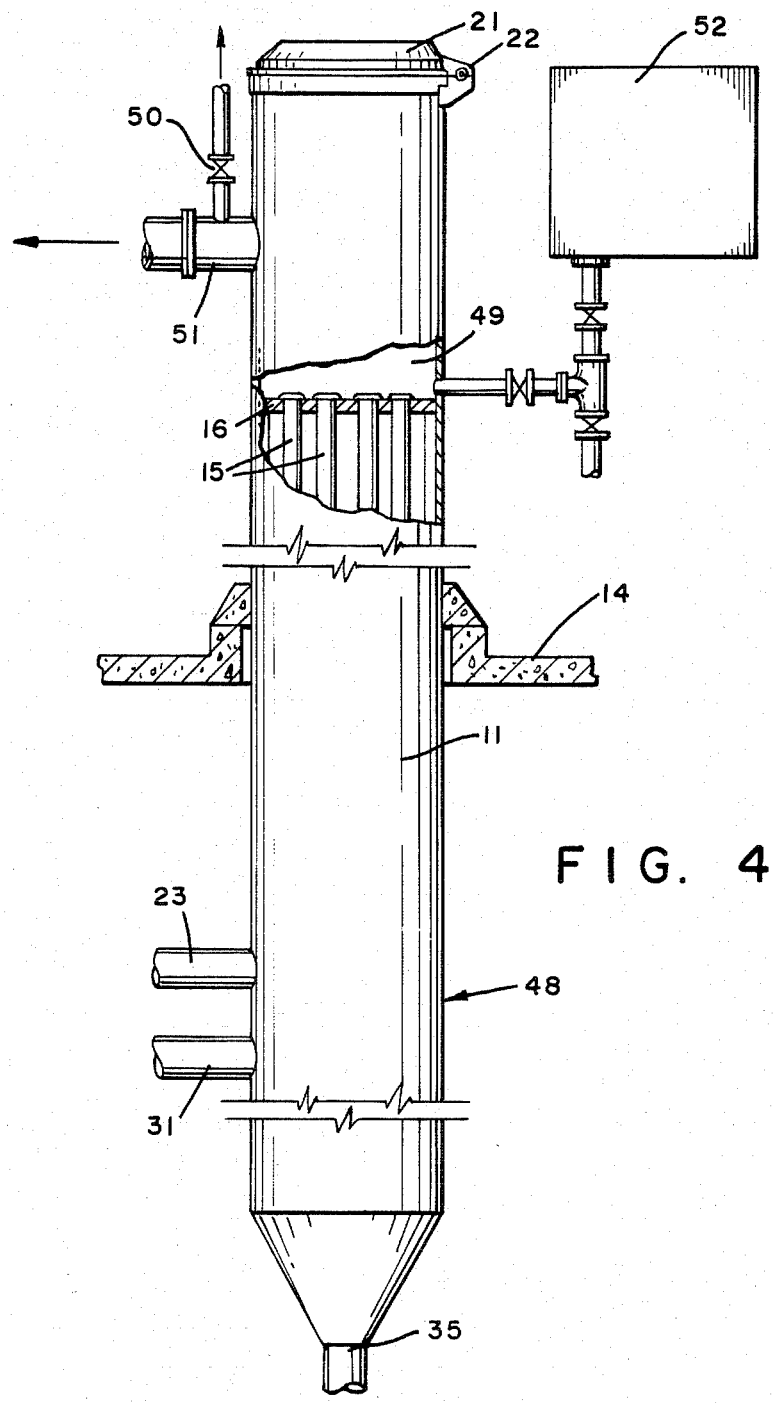
FIG. 4 is a schematic view similar to FIG. 1 of another type pressure filter incorporating the present invention.

The pressure filter 48 disclosed in FIG. 4 contains the same internal components of the filter of FIGS. 1 to 3 except that the filtrate chamber 49 is enlarged and the pressure head box is eliminated. The filtration cycle is the same as described for the filter 10 of FIGS. 1 to 3 but the backwashing of filter elements 15 is accomplished by venting filtrate chamber 49 to the atmosphere by opening valve 50 in the filtrate discharge pipe 51 causing hydrostatic pressure to release the filtrate in chamber 49 back through filter elements 15 with the assistance of barometric leg assist 30 and the sump pump for sump outlet 36. In addition an acid storage tank 52 is shown in FIG. 4 with appropriate valve control pipes to connect tank 52 filtrate chamber 49 periodically cleaning of filter elements 15 with acid when needed.

In a pilot test of a device of the type described a 4 foot long cylindrical shell was used as tank 11 and had an inside diameter of approximately 6 inches and a filtering element 18 inches long and $2\frac{1}{2}$ inches in diameter therein. A slurry was pumped to the cylinder and was found to achieve the complete cake discharge and required liquor clarification. The following values were fixed for the testing period based on the results of the parametric studies:

Filtrate Rate—11.5 gpm
Backflush Volume—0.75–1.0 gal.
Filtration Time—22–24 sec.
Backflush Time—3 sec.
Forward Flush Time—7 sec.
Maximum Pressure—50 psi
Cake Thickness—12.5–16.5 mm The results of the test which ran continuously for ten days at consecutive cycles of averaging 30 seconds based on the flow of causticized liquor including backflush that the unit tested filtered approximately 16 gpm/sq. ft. as compared to known pressure filters of 1.38 gpm/sq. ft. represents a twelve-fold increase in performance. The clarity of the liquor from the test unit was analyzed and found to be in the range of between 16 and 18 ppm which is acceptable filtrate clarity.

In extrapolating these test results to a filter having the aforesaid size of filter 10 the following capacities and results are achievable in a 25 second filtering and a 5 second discharge and backwash cycle assuming a feed slurry having the following density:

| Densities | | | | |
| --- | --- | --- | --- | --- |
| 1.17 S.G. | Feed at 10% solids | 9.76#/gal. | 0.102 Gal/# |
| 1.10 S.G. | W. Liquor at 0% solids | 9.17#/gal. | 0.109 Gal/# |
| 2.70 S.G. | CaCO$_3$ at 100% solids | 22.5#/Gal. | 0.044 Gal/# |
| 1.45 S.G. | U. Flow at 40% solids | 12.5#/Gal. | 0.083 Gal/# |
| Average Production 550 GPM White Liquor | | | |
| Filtering: 25 sec/cycle | | | |
| w. Liq. at 0% | | 330 gals. | |
| solids at 100% | | 11 gals. | |
| Feed at 10% | | 341 gals. (818 gpm) | |
| Discharging: 5 sec/cycle | | | |
| Backflush at 0% | | 55 gals. | |
| Fwd. flush at 10% | | 99 gals. (1188 gpm) | |
| Total Displacement Flush | | 154 gals. (1848 gpm) | |
| Underflow | | | |
| Feed at 10% to mud | | 57.5 gals | |
| Bypass Flow (via Barometric leg) | | | |
| Bypass at 10% | | 96 gals. (1157 gpm) | |
| Under-Flow Balance | | | |
| | W. Liq | Solids | |
| 5715 gal. feed | 505# | 56# | |
| 12.3 gal. solids | — | 277# | |
| Total | 505# | 333# (40% solids) | |

As will be appreciated from the foregoing description a novel pressure filter and method for operation has many advantages in use. Among other advantages is that the high performance filtration is achieved without sacrificing clarity in the filtrate discharge. In addition forward displacement flushing from a central feed tube aids in removing solids from the filter elements and shortening of the cycle time while a partial barometric leg creates a pressure differential to assist in the backflushing portion of the filtration and thickening cycle.

Although two embodiments of the present invention have been described in detail it is to be expressly understood that the invention is not limited thereto. Various changes can be made in the design arrangement of parts and in the method without departing from the spirit and scope thereof as the same will now be understood by those skilled in the art.

What is claimed is:

1. A pressure filter for separating a liquid from a liquid slurry solution and thickening a solids slurry for discharge as underflow from said filter comprising
   a. a vertical cylindrical tank,
   b. a plurality of tubular filter elements suspended in spaced and parallel vertical relationship from one side of a support plate disposed in the upper portion of said tank,
   c. a filtrate receiving chamber located at the opposite side of said support plate for receiving filtrate from said filter elements,
   d. a sump discharge outlet at the base of said tank for discharging the thickened solids slurry removed from said filter elements,
   e. a feed slurry inlet to said tank,
   f. feed distribution means in said tank and including a feed tube connected to said feed slurry inlet to said tank, said feed tube having a discharge end positioned adjacent said upper ends of said filter elements spaced from the undersurface of said support plate,
   g. means provided to selectively effect backflow of the filtrate in said filtrate chamber to said filter elements to remove cake from said filter elements,
   h. a displacement zone in said tank beneath said filter elements for receiving the filter cake removed from said filter elements, and
   i. a barometric leg provided in said tank for effecting a vacuum assist during the backflow of filtrate to said filter element and for returning feed slurry to a feed slurry tank during the removal of said filter cake from said filter element through an entry port located in said displacement zone,
   j. said displacement zone extending from the lower ends of said filter elements to the entry port to said barometric leg a predetermined distance sufficient to prevent said removed cake from discharging through said entry port.

2. The pressure filter of claim 1, wherein said filter elements are arranged in a ring about the circumference of said undersurface of said support plate and wherein said feed tube is positioned at the center of said ring of filter elements.

3. The pressure filter of claim 2 wherein said feed tube includes a cylindrical member having a diameter approximately equal to the radius of said filter tank and extending vertically approximately the height of said filter elements.

4. The pressure filter of claim 3 wherein said filter elements comprise perforated tubular shaped members having filter socks disposed about the outer surface thereof and having an end open to said filtrate receiving chamber and wherein said tubes are located between said inner wall of said filter tank wall and the outer wall of said feed tube cylinder.

5. The pressure filter of claim 1 wherein said barometric leg is provided with a funnel shaped end portion in said tank.

6. The pressure filter of claim 1 wherein normally close valves are provided in said barometric leg and said sump outlet and operable to an open condition in the backwashing of said filter elements.

7. A method of continuously thickening a suspension of solids by filtration under pressure to deliver a filtrate liquor and a thickened sludge underflow with a periodic backwashing of the filter media comprising the steps of establishing a pressure filtration zone in a filter tank defined by the height of elongated filter elements suspended in said tank having their upper ends attached to a plate so that filtrate from said elements passes upwardly from said filtration zone into a filtrate compartment, establishing a filter cake displacement zone in the area between the opposite ends of said filter elements and a barometric discharge leg, feeding a slurry solution to said tank at a high rate of flux for a predetermined period wherein feed slurry occupies said displacement zone during a filtration process, periodically providing a supply of backwash filtrate to said filtration zone to displace cake from said filter elements to said displacement zone; continuing to maintain said high feed rate of feed slurry to aid in said displacement during said backwashing, and at the same time removing feed slurry in the displacement zone during said backwashing step, and passing thickened slurry to a discharge sump upon completion of said backwashing step.

8. The method of claim 7 wherein a vacuum assist is provided to said backwashing step by the barometric leg and wherein said feed slurry in said displacement zone is removed from said tank through said barometric leg during said backwashing of the filter element.

9. The method of claim 7 wherein the filtration and thickening backwash and discharge cycle is about 30 seconds.

10. The method of claim 9 wherein said backwash and displacement portion of said cycle is about 5 seconds.

11. The method of claim 10 wherein the rate of slurry feed to said tank is increased during said backwash and displacement portion.

* * * * *